United States Patent
Apple et al.

(10) Patent No.: US 9,888,111 B1
(45) Date of Patent: Feb. 6, 2018

(54) SYSTEMS AND METHODS FOR INSTITUTIONAL MESSAGING

(71) Applicants: CONFINEMENT TELEPHONY TECHNOLOGY, LLC, Greensboro, NC (US); Dan Apple, Elon, NC (US)

(72) Inventors: Wesley Larry Apple, Elon, NC (US); Timothy Edwin Pabon, Greensboro, NC (US); John Vincent Townsend, Kernersville, NC (US); Charles David Orr, Burlington, NC (US); Johnnie Richard Tayloe, Rural Hall, NC (US); Phillip Matthew Apanovitch, Glastonbury, CT (US); Charles Margosian, Wayland, MA (US)

(73) Assignee: CONFINEMENT TELEPHONY TECHNOLOGY, LLC, Greensboro, NC (US)

( * ) Notice: Subject to any disclaimer, the term of this patent is extended or adjusted under 35 U.S.C. 154(b) by 0 days.

(21) Appl. No.: 15/273,538

(22) Filed: Sep. 22, 2016

Related U.S. Application Data

(63) Continuation of application No. 13/452,316, filed on Apr. 20, 2012, now Pat. No. 9,491,291.

(60) Provisional application No. 61/477,268, filed on Apr. 20, 2011.

(51) Int. Cl.
*H04M 3/38* (2006.01)
*H04M 3/487* (2006.01)
*H04M 3/20* (2006.01)

(52) U.S. Cl.
CPC ............... *H04M 3/38* (2013.01); *H04M 3/20* (2013.01); *H04M 3/4872* (2013.01)

(58) Field of Classification Search
CPC ... H04M 3/493; H04M 3/533; H04M 3/53333
USPC .................. 379/67.1, 201.01, 265.01–266.1; 370/352; 705/346; 707/999.01
See application file for complete search history.

(56) References Cited

U.S. PATENT DOCUMENTS

| | | | | |
|---|---|---|---|---|
| 7,707,149 B2 * | 4/2010 | Lee | .................... | G06F 17/30286 707/999.01 |
| 2011/0178947 A1 * | 7/2011 | McNutt | .................... | A47F 10/06 705/346 |
| 2011/0317685 A1 * | 12/2011 | Torgersrud | .............. | H04L 12/66 370/352 |

* cited by examiner

*Primary Examiner* — MD S Elahee
(74) *Attorney, Agent, or Firm* — Thompson Hine LLP

(57) ABSTRACT

Methods and systems for automating messaging in an institutional setting by assigning a resident of an institution a control mechanism, providing the resident access to a messaging system via a telecommunications system, and providing one or more message options to the resident as a function of the resident's control mechanism.

14 Claims, 9 Drawing Sheets

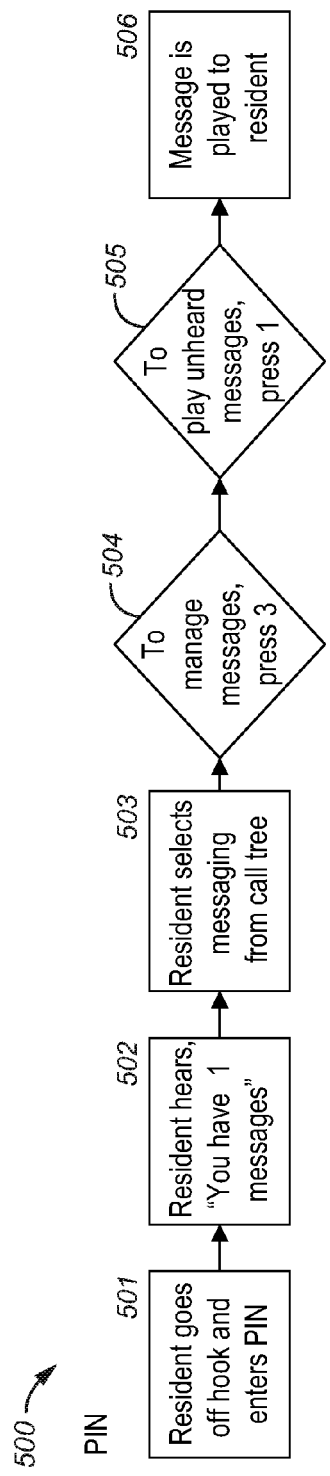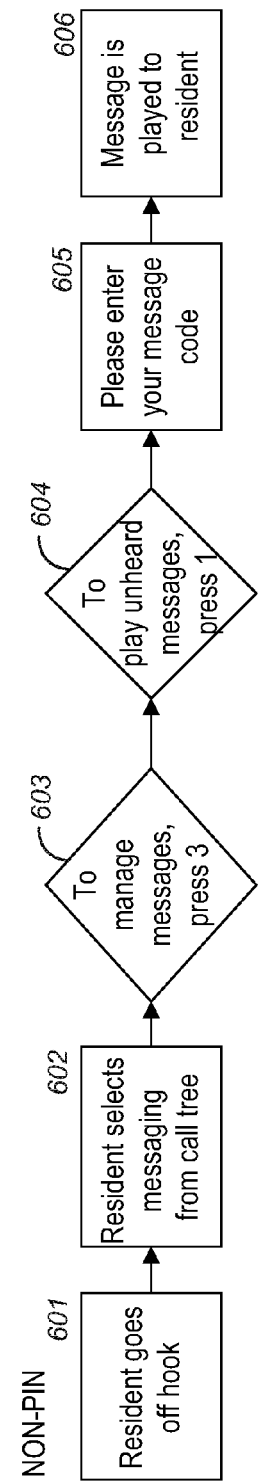
Figure 5
Figure 6

SYSTEMS AND METHODS FOR INSTITUTIONAL MESSAGING

RELATED APPLICATIONS

This application is a continuation of U.S. patent application Ser. No. 13/452,316, filed on Apr. 20, 2012, which claims the benefit of U.S. Provisional Application No. 61/477,268 filed on Apr. 20, 2011, each of which is incorporated herein by reference.

FIELD OF THE INVENTION

The present subject matter relates to the creation, storage, delivery, and resolution of messages that are created or received by users of an institutional telecommunications system, along with corresponding reporting and auditing capabilities on such messages. More particularly, the present subject matter relates to the creation, storage, and resolution of such messages that arise from customer service and complaint resolution, communications between institutional residents and institutional staff, and communications between institutional residents and parties who are not residents at a particular institution which is served by a telecommunications system incorporating the techniques of the present subject matter.

BACKGROUND OF THE INVENTION

In the context of the daily operation of a residential institution, such as a correctional or confinement facility, proper handling of messages and communications between residents and staff, between residents and telecommunications service providers, and between residents and non-residents, has traditionally been accomplished in a variety of time-consuming and inefficient manners.

In one common example, due to constraints that are often placed upon such residents, access to "live" telephone operators is commonly prohibited. Therefore, complaints or questions regarding telecommunications services must be handled using institutional staff to act as an intermediary between the resident and the telecommunications service provider. This imposes a large time burden on institutional staff and accordingly, leads to inefficiency, poor utilization of otherwise specialized personnel, and slow turnaround times for the customer, i.e. the resident. Further, due to the use of an intermediary as the liaison between customer (resident) and vendor (telecommunications service provider), the telecommunications service provider often receives incomplete or inaccurate information describing a condition or problem. This results in a loss of efficiency, slower turnaround times, and the corresponding loss of system availability and potential revenue for the telecommunications service provider as well as for other parties that may share in the telecommunications revenue, as is commonly the case with commissions paid from the telecommunications service provider to the operator of the residential facility.

In another common example, announcements or reminders from staff to residents are commonly distributed as written material delivered by hand, passed verbally, or posted in some public area. These methods of distribution often fail in terms of reliability, lack of timeliness or specificity to a particular resident, lack of documented delivery, or lack of efficient use of institutional staff time & resources. Examples of such announcements or reminders would include, but not be limited to, a reminder to a particular resident of an upcoming appointment, or an announcement to all residents of an upcoming policy change, such as meal times, recreation availability, etc.

Yet another common example of inefficiencies in message handling can be found in the area of formal communications between residents and institutional staff. In the inmate confinement arena, for example, these communications are commonly referred to as "kites" and are used by residents to make various requests, officially lodge complaints, schedule appointments, and various other functions that require some level of documentation. Traditionally, the process has included a resident first making a verbal request to a staff member for a blank copy of a particular type of form corresponding to the type of request the resident wishes to initiate. Next, the institutional staff must retrieve the form from a storage location and deliver it by hand to the resident. The resident must complete the form and submit the completed form to institutional staff, who must then hand-deliver the form to the appropriate department for action. Taking into consideration that this process is used to document a very wide array of requests from residents, it becomes apparent that a significant amount of institutional staff time must be dedicated to the handling of these requests.

Yet another common example of messaging can be found in the communications between non-residents of the institution and institutional staff. These communications are often in the form of information requests by family or friends of the resident. Commonly requested information includes, but is not limited to, such data as projected release dates, upcoming hearings, pending criminal charges, etc. Traditionally, these requests come in the form of telephone calls or personal visits, and are handled by institutional staff, requiring significant amounts of staff time to speak with the inquiring party and to obtain and relay the requested information. Furthermore, the information given to the inquiring party is accurate only at that particular moment in time. Subsequent changes to the data would only be apparent to the inquiring party if they were to make a subsequent inquiry. Given the volatile nature of these types of data, it is quite common for a single party to make multiple inquiries within a short period of time to obtain updates of a resident's status.

Yet another common example of messaging can be found in one-way communications between residents and non-residents of an institution. Traditionally, two-way communications between residents and non-residents must be initiated by the resident, therefore preventing outside parties from calling into the institution. While this restriction does offer the institutional facility a high degree of control over who is talking to whom, it also effectively prevents a number of communications due to both parties not being available at the exact same point in time, as is required in a two-way telephone call. Methods for enabling one-way, or asynchronous, communications between two parties are not commonly employed in the institutional setting.

Still another common example of messaging within a residential institution can be found in communications between two or more institutional staff members, as well as in the documentation, or logging, of a particular event for future reference by a staff member. Examples of these types of messages include, but are not limited to, logging of a properly executed head count, logging of maintenance conditions, as well as communications intended for immediate distribution to one or more additional staff members, such as a call for assistance.

SUMMARY OF THE INVENTION

The limitations of the prior art are overcome and a technical advance is made in accordance with the present subject matter, detailed embodiments of which are presented in the following detailed description.

In accordance with one aspect of illustrative embodiments, message handling and processing is accomplished in a residential institution telecommunications context by an automated computer software system which is integrated at multiple levels with the operation and provision of telecommunications and billing services and with other particular components and databases contained within the institutional management software systems.

In some embodiments, an automated software system introduces a number of novel features, techniques, and methods into the telecommunications system and makes use of various processes, some of which are operated independently, and some of which advantageously integrate with existing systems in order to obtain maximum efficiency, transparency, and accountability.

In some embodiments, a Customer Service process is provided to the residents and facility staff users of the telecommunications system. This feature utilizes automated voice prompts and interprets corresponding responses to provide for the creation of a record in a relational database of a customer service request event.

In some embodiments an Announcement process is provided. The Announcement process includes methods and techniques that allow the institutional staff or the telecommunications service provider to play pre-recorded announcement messages to residents or users of the telephone system.

In some embodiments, methods and techniques for incorporating a Resident-Staff Communication process are provided. The Resident-Staff Communication process utilizes the telephone system to enable the residents or other authorized non-staff parties as established by the facility, such as case workers or ministers, to initiate a broad array of documented requests to the institutional staff or to other authorized non-staff parties as established by the facility.

In some embodiments, methods and techniques for incorporating an Asynchronous Messaging process into an institutional telephone system are provided. This Asynchronous Messaging process enables residents and non-residents to communicate via recorded audio messages as well as via written communications. The Asynchronous Messaging process enables communication between parties to be stored at a time when one party is not available and delivered at a later time when the party is available.

In some embodiments, methods and techniques for incorporating a Dynamic Help process for users of a telephone system are provided. This Dynamic Help process provides interactive instructions, tips, and other information useful in the utilization of the telephone system.

In some embodiments, methods and techniques for an Internal Messaging and Documentation process are provided. The Internal Messaging and Documentation process enables facility staff to utilize the telephone system to log events and to communicate messages globally or to particular other staff members or groups of staff members.

In some embodiments, methods and techniques for a Resident Information Subscription process are provided. The Resident Information Subscription process enables non-residents to obtain current, up-to-date information regarding a particular resident, as permitted by the institution or applicable governing laws.

BRIEF DESCRIPTION OF THE DRAWINGS

These and other advantages of illustrative embodiments of the present invention will be apparent to those skilled in the art by reference to the following detailed description and the accompanying drawing figures, in which:

FIG. 5 is a flowchart illustrating functions performed by a Resident-Staff Communication Process according to certain embodiments.

FIG. 6 is a flowchart illustrating functions performed by a Resident-Staff Communication Process according to certain embodiments.

DETAILED DESCRIPTION

Detailed embodiments are disclosed herein. However, it is to be understood that the disclosed embodiments are merely exemplary and that different embodiments are possible. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the present disclosure.

Figure 1:
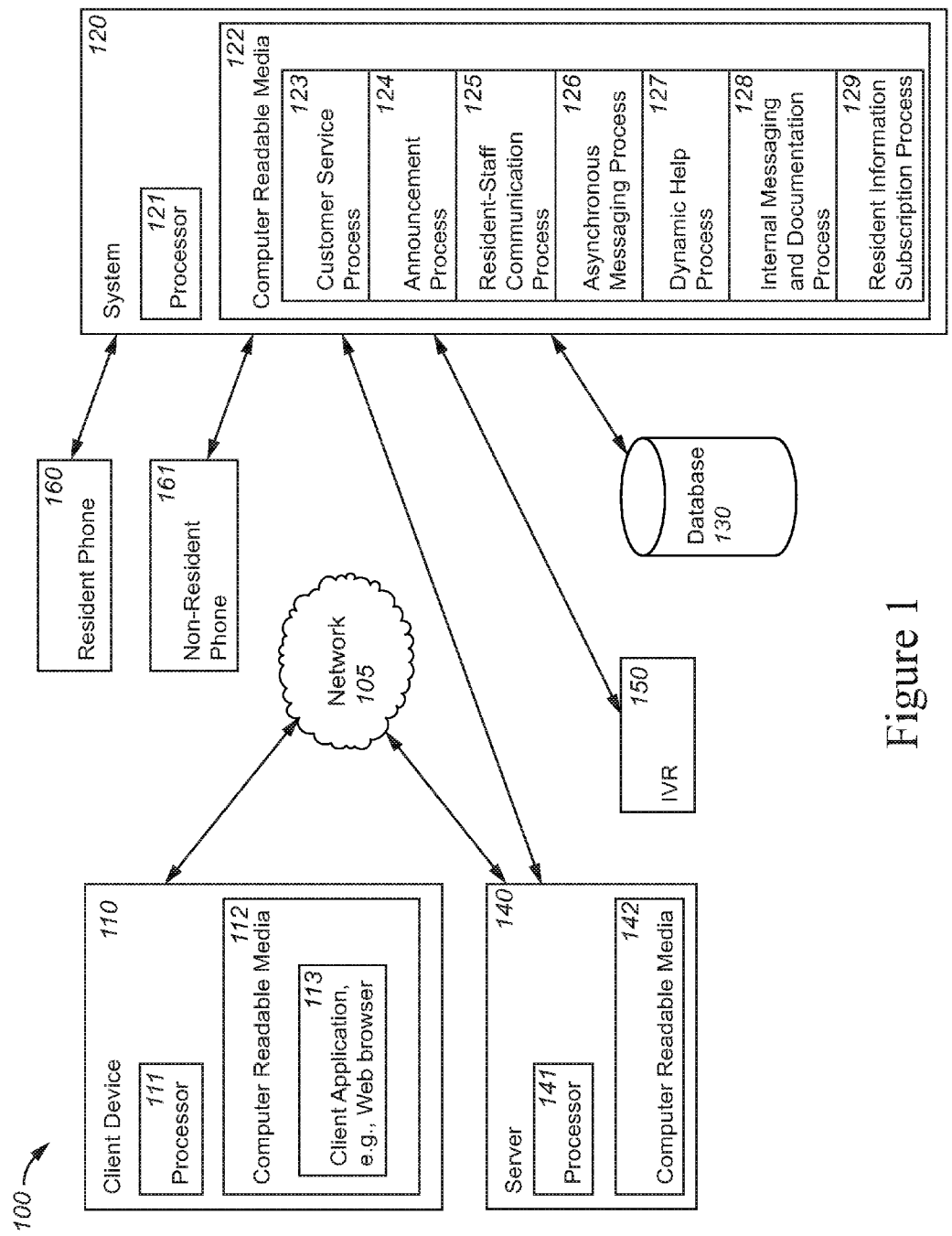
FIG. 1 illustrates an exemplary system in certain embodiments.

An exemplary embodiment provides messaging processes in an institutional setting. FIG. 1 illustrates an exemplary system 100 comprising a messaging service device 120, which could be operated by a telecommunications service provider ("TSP"), with a processor 121 and computer readable media and storage capabilities 122. Stored within this main system is appropriate hardware, firmware, and/or software for implementing a customer service process 123, announcement process 124, resident-staff communication process 125, asynchronous messaging process 126, dynamic help process 127, internal messaging and documentation process 128, and resident information subscription process 129. Coupled to the messaging service device 120 is a database 130 comprising resident messaging and other records. Also coupled to the messaging service device 120 is a server 140 comprising a processor 141 and computer readable media and storage capabilities 142. Server 140 is accessible by a client device 110 across a suitable network 105, for example a local area network or the Internet. Such access could be wired or wireless, as is well known to one of ordinary skill in the art. Client device 110 comprises a processor 111 as well as computer readable media and storage capabilities 112 with client applications such as a web browser 113. Messaging service device 120 may also provide for interactive voice recognition ("IVR") functionality 150. Messaging service device 120 is also coupled to a one or more phones 160 accessible by residents of the institution. Similarly one or more non-resident phones 161 may also be coupled to the main system 120. Such coupling is via any suitable telephone network, as would be understood by one of ordinary skill in the art. Institution residents may also optionally access messaging service device 120 through a wireless device (not shown) or through a kiosk (not shown) as would be understood by one of ordinary skill in the art.

Applications and other electronic content execute or are otherwise used on the exemplary computer devices 110, 120, and 140 and are shown as functional components or modules. As is known to one of skill in the art, such applications and content may be resident in any suitable computer-readable medium and execute on any suitable processor. For example, as shown the client device 120 comprises a computer-readable medium 122 such as a random access memory ("RAM") coupled to a processor 121 that executes computer-executable program instructions and/or accesses information stored in memory (not shown). Such a processor 121 may comprise a microprocessor, an ASIC, a state machine, or other processor, and can be any of a number of computer processors. Such a processor can comprise, or may be in communication with a computer-readable medium which stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The client device 110 may also comprise a number of external or internal devices such as a mouse, a CD-ROM, DVD, a keyboard, a display, audio speakers, one or more microphones, or any other input or output devices. Device 110 could be a personal computing device, a mobile device, or any other type of electronic devices appropriate for providing one or more of the features described herein.

Phones 160, 161 could be any type of phone appropriate for providing one or more of the features described herein.

The processes operating on system 120 are described in further detail below.

Customer Service Process

Methods are provided that permit the user to describe the current condition, question, or complaint via a selection from a predetermined list of reportable conditions, as well as, optionally, to digitally record and store a verbal message of limited duration for use by telecommunications support personnel in investigating a case. For systems that utilize a Personal Identification Number ("PIN") as a resident identification feature, the resident's PIN or an identification ("ID") number associated with the PIN can be included in the database record of the event and can be used for tracking and subsequent communication of the resolution of the issue. For systems that do not utilize a PIN-based resident identification feature, a unique case number can be assigned to the record and can be used by the resident to subsequently track the resolution of the issue. The database record of the event can be populated with and/or linked to any pertinent information related to the matter, which may include, but not be limited to, the particular location of the resident phone within the facility, the time and date of the event, the recent calling history of the resident, including the call that gave rise to the complaint, available recordings of telephone conversations with matching criteria, the external telephone number that was attempted to be called, along with the optional voice recording created by the resident to describe the condition.

One purpose of the Customer Service process is to allow the resident to report Resident Telephone System ("RTS") issues directly to the TSP and allow the TSP to respond directly to the resident without involving facility staff. Issues may include dropped calls, poor call quality, broken/damaged phones, etc. The system can utilize both voice and call flow to obtain the necessary information from the resident. Consider the following example:

Resident uses the messaging system to let the TSP know there is a broken handset in his pod
    Resident will select the "to report a broken phone in his area" option
        Resident can record a brief 10 second message letting the TSP know the location of the broken phone Resident uses the messaging system to request a refund from a dropped Debit Call
    Resident will select the "to report a dropped call" option
        System will do a backup on the last call the resident placed and ask the resident if they are reporting the call they just placed to (xxx) xxx-xxxx and time of call
        If resident selects "no" the system will give the option to allow the resident to enter the area code and telephone number of the call with a problem or to play back the last 5 billable calls allowing the resident to select the specific call
        If the resident selects to enter the area code and telephone number the system will play back the last 5 billable calls allowing the resident to select the call The TSP customer service representatives ("CSRs") can have a custom application that runs on their desktops. When a new message arrives it can be displayed in the application for the TSP to research and respond. The application can provide the TSP CSRs with a predefined list of responses to the resident. Additionally the TSP can have the option of creating a custom message. In the event the TSP CSR sends a custom message, this message can be flagged in the RTS so the facility can identify these messages for review. The TSP's response can be in text format stored in the database, which can allow for search capability, including keyword searching. When a resident elects to listen to a message, the message can go through a text-to-voice conversion process to be played back to the resident.

If the resident's message option resulted in a brief recorded message this recording can be made available to a TSP CSR for review. The recording can also be available to the facility. If the resident's message option can be fulfilled without the use of a brief recording, the data entered by the resident on the phone can be available to the TSP CSRs and the facility.

If PINs are utilized at the facility the resident and responding TSP CSR identities can be captured and stored with the message. If PINs are not used only the responding TSP CSR's identity can be captured and stored with the message. Historically-tracked messages can be maintained for the life of a facilities contract. All data can be stored in a corresponding database such as 130 with the exception of any recorded messages, which can be stored as .WAV files in a file system structure.

The resident to TSP CSR options can exist as an option on a main messaging sub-menu. Once this option has been selected the resident can be presented, for example, with a sub-menu such as the following exemplary sub-menu:

To report a dropped call or badconnection, press 1
To change your allowed calling list, press 2
To report a broken phone, press 3
To return to the previous menu, press9

Only the options relevant to a facility need be enabled, i.e. if a facility does not utilize allowed call lists, this option would not be available. Additional options can be added at a later time.

To Report a Dropped or Bad Connection

This option can allow the resident to report a problem to the TSP concerning a dropped call or call quality issues on a call where the inmate is paying for the call. The TSP can research the call in question and issue a refund to the resident if it is determined there was a valid problem with the call. The resident can be notified of the results of the TSP's investigation through a predefined message and can be provided with the dollar amount in the event a refund is issued.

In a PIN-based facility when a resident selects the option to report a dropped call or bad connection, the system can look up the most recent call placed by the resident and automatically ask the resident if this is the call they are referring to. If the call is not correct, the system can ask the resident to enter an area code and telephone number. The system can then look up the last 5 billable calls to this number and present the resident with a list to select from. If the phone number has not received any calls from the resident whose PIN was entered at the beginning of the call, the resident can receive a message stating that "No calls have been placed to (xxx) xxx-xxxx by this PIN" (where "(xxx) xxx-xxxx" represents the telephone number in question).

Figure 2:
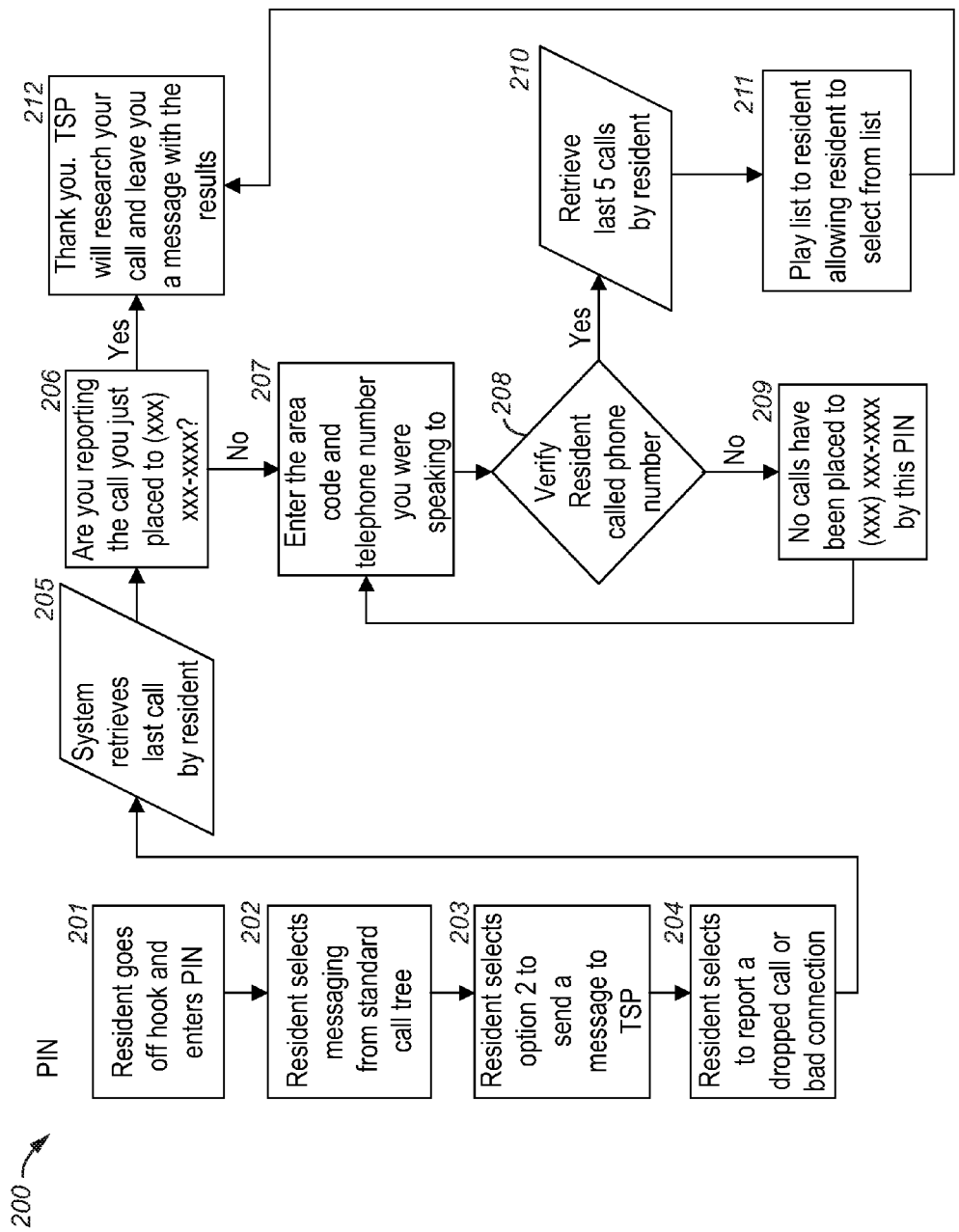
FIG. 2 is a flowchart illustrating functions performed by a Customer Service Process according to certain embodiments.

FIG. 2 illustrates processes performed by a Customer Service Process 200 according to certain embodiments. The process begins at box 201 where the resident causes the telephone to go off hook and is prompted to enter his PIN. The process then proceeds to box 202 where the resident is presented a set of options in a calling tree. The options presented in a calling tree can be determined by the institution. In this exemplary embodiment, the resident selects an option of sending a message to the TSP at box 203. At box 204, the resident selects a more specific option from the calling tree to report a dropped call or some other problem with a calling connection. In response to this choice the system at box 205 retrieves information about the last call associated with the resident's PIN. At decision box 206, the resident indicates whether the message being reported relates to the last call placed. To identify the particular call, the number to which the call was connected can be provided to the resident as well as any other helpful identifying information (such as for example time and date of the call). If the response is "no" then the process branches to box 207 where the resident is prompted to enter information to identify the call to which the problem being reported relates. This information can comprise, for example, the area code and telephone number to which the resident's call was connected when the problem being reported occurred. At decision box 208 the process verifies that the resident was actually connected to the identified call. If the answer is "no" then the process branches to box 209 where the resident is informed that no record of the identified call exists. The process then returns to box 207. A limit on the number of times a resident can attempt to identify the call with which the problem is associated can be built into the process so that after a certain number of failed attempts the process informs the resident and ends. If at decision box 208 the answer is "yes" the process then branches to box 210 where the process retrieves the last 5 calls placed by the resident and at box 211 gives the resident the option of selecting one of the calls from this list of 5 calls. Of course, the number of calls is 5 in this exemplary embodiment but can be any desired number. From box 211 the process then proceeds to box 212 where the TSP informs the resident that the problem will be researched and a message reporting the result will be provided to the resident. Returning to decision box 206, if the answer is "yes" then the process branches to box 212.

Figure 3:
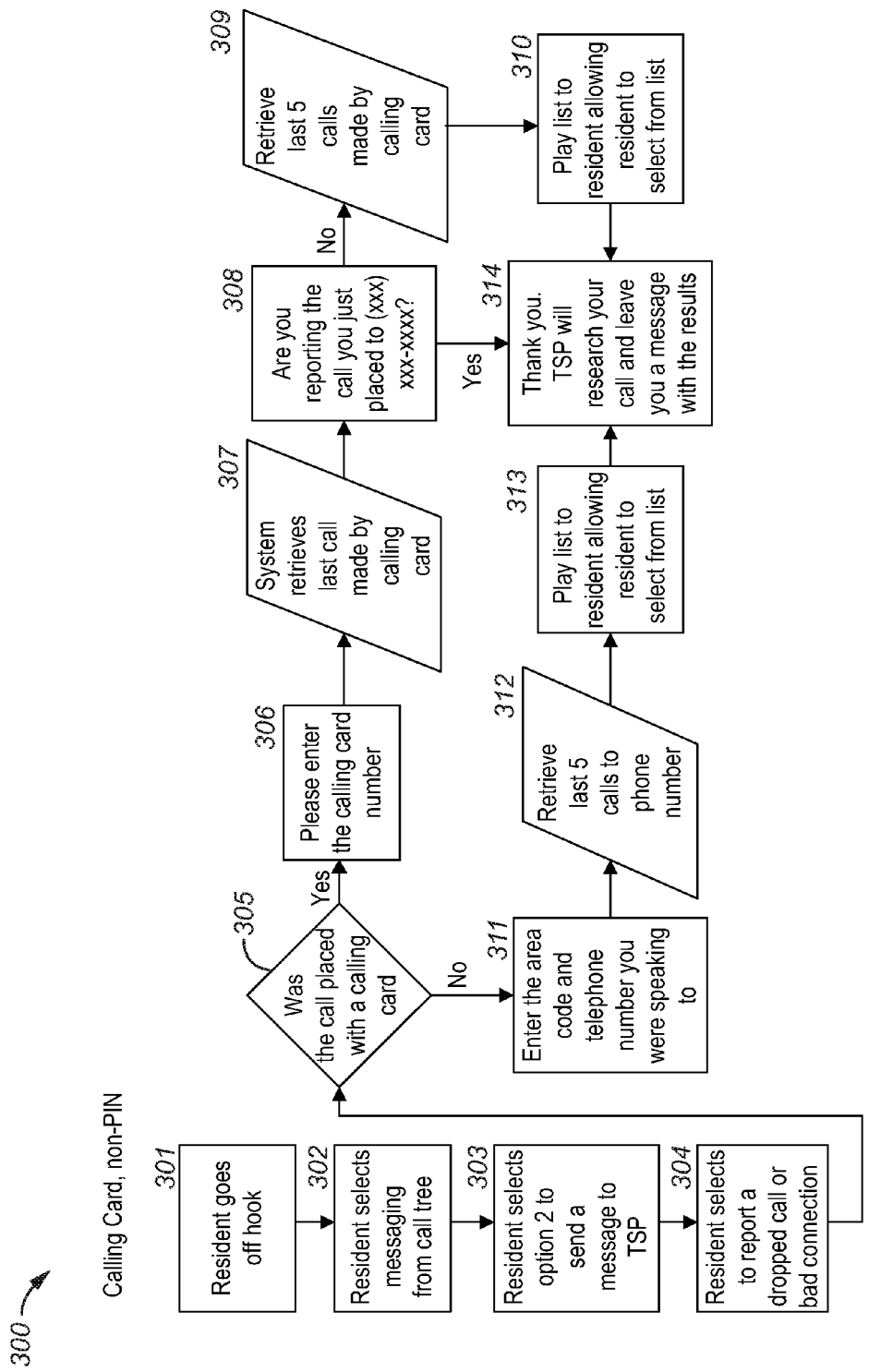
FIG. 3 is a flowchart illustrating functions performed by a Customer Service Process according to certain embodiments.

If the facility does not use PINs but uses calling cards, the flow can be similar with the following changes. Once the resident has selected to report a dropped call they can be asked if the call was placed using a calling card or not. If the call in question was a calling card call the system will prompt for the calling card number to reference the call history. FIG. 3 illustrates processes performed by a Customer Service Process 300 according to certain embodiments. The process begins at box 301 where the resident causes the telephone to go off hook. The process then proceeds to box 302 where the resident is presented a set of options in a calling tree. In this exemplary embodiment, the resident selects an option of sending a message to the TSP at box 303. At box 304, the resident selects a more specific option from the calling tree to report a dropped call or some other problem with a calling connection. At decision box 305 the resident indicates whether the call for which the problem is being reported was placed using a calling card. If the answer is "yes" then the process branches to box 306 where the resident enters the calling card number. The system at box 307 retrieves information about the last call associated with the calling card. At decision box 308, the resident indicates whether the message being reported relates to the last call placed. To identify the particular call, the number to which the call was connected can be provided to the resident as well as any other helpful identifying information (such as for example time and date of the call). If the response is "no" then the process branches to box 309 where the process retrieves the last 5 calls placed with the calling card and at box 310 gives the resident the option of selecting one of the calls from this list of 5 calls. Of course, the number of calls is 5 in this exemplary embodiment but can be any desired number. From box 310 the process then proceeds to box 314 where the TSP informs the resident that the problem will be researched and a message reporting the result will be provided to the resident. Returning to decision box 308, if the answer is "yes" then the process branches to box 314. Returning to decision box 305, if the answer is "no" then the process branches to box 311 where the resident is prompted to enter information to identify the call to which the problem being reported relates. This information can comprise, for example, the area code and telephone number to which the resident's call was connected when the problem being reported occurred. The process then branches to box 312 where the process retrieves the last 5 calls placed to the identified telephone number and at box 313 gives the resident the option of selecting one of the calls from this list of 5 calls. Of course, the number of calls is 5 in this exemplary embodiment but can be any desired number. From box 313 the process then proceeds to box 314.

The TSP CSRs can receive a notification via a messaging application that a new issue has been logged by a resident. The TSP can have access to the information provided by the resident and the call recording. The call can be investigated to determine if the call experienced any issues, and once the investigation is complete the TSP can select from a predefined list of responses for the resident that can identify the nature of the dropped call and whether or not a refund has been credited to the account. For example, the following are possible (exemplary) responses to an exemplary report of a dropped call:

Your mm/dd/yyyy report of a dropped call to (xxx) xxx-xxxx has been investigated. A credit for the call connection fee $x.xx has been issued to the account. Thank you for reporting this problem.

Your mm/dd/yyyy report of a dropped call to (xxx) xxx-xxxx has been investigated. The disconnect appears to have been caused by the phone service used by the called party. No credit or adjustment is due.

Your mm/dd/yyyy report of a dropped call to (xxx) xxx-xxxx has been investigated. The disconnect resulted from the called party's attempt to initiate a prohibited three-way or conference call. No credit or adjustment is due.

Your mm/dd/yyyy report of a dropped call to (xxx) xxx-xxxx has been investigated. The disconnect occurred after your conversation reached the maximum allowed length of time. No credit or adjustment is due.

Your mm/dd/yyyy report of a dropped call to (xxx) xxx-xxxx has been investigated. The disconnect occurred due to the called party hanging up. No credit or adjustment is due.

To Change Your Allowed Calling List:

This option can allow the resident to manage their own allowed calling list, if such a list is utilized by the facility. Allowed call lists are not used in non-PIN facilities; therefore this option would not be available in such facilities. If the facility does utilize allowed call lists there can be an option to allow the resident to manage their own list. If enabled the resident can directly add/delete new phone numbers without having to involve facility staff. Additionally the facility can have the ability to approve all add/deletes or to automatically allow them. As an example, this option can present the following sub-menu to the resident:

To delete a number from your allowed list, press 1
To add a number to your allowed list, press 2
To return to the previous menu, press 9

Figure 4A:
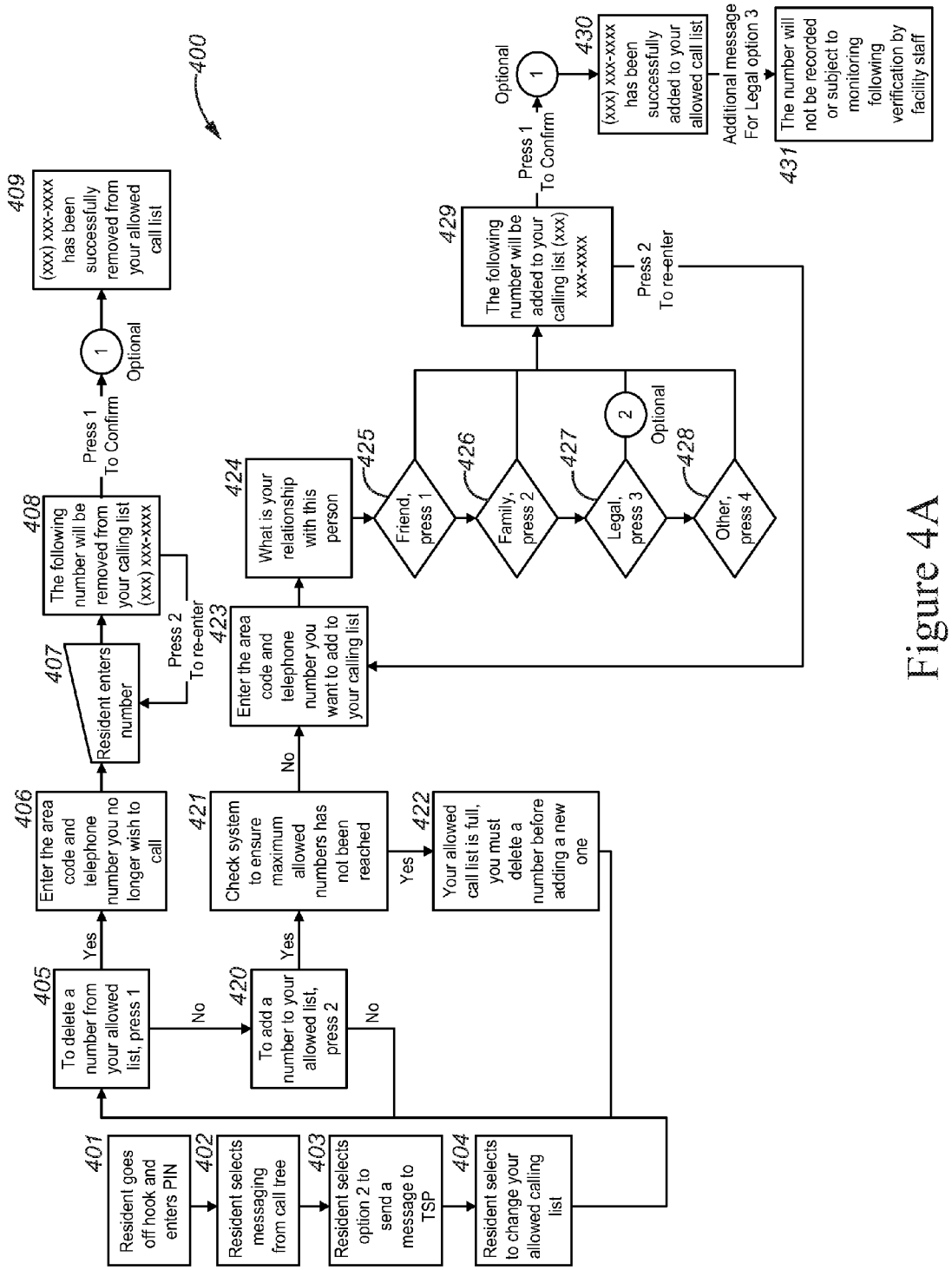
FIG. 4A is a flowchart illustrating functions performed by a Customer Service Process according to certain embodiments.
Figure 4B:
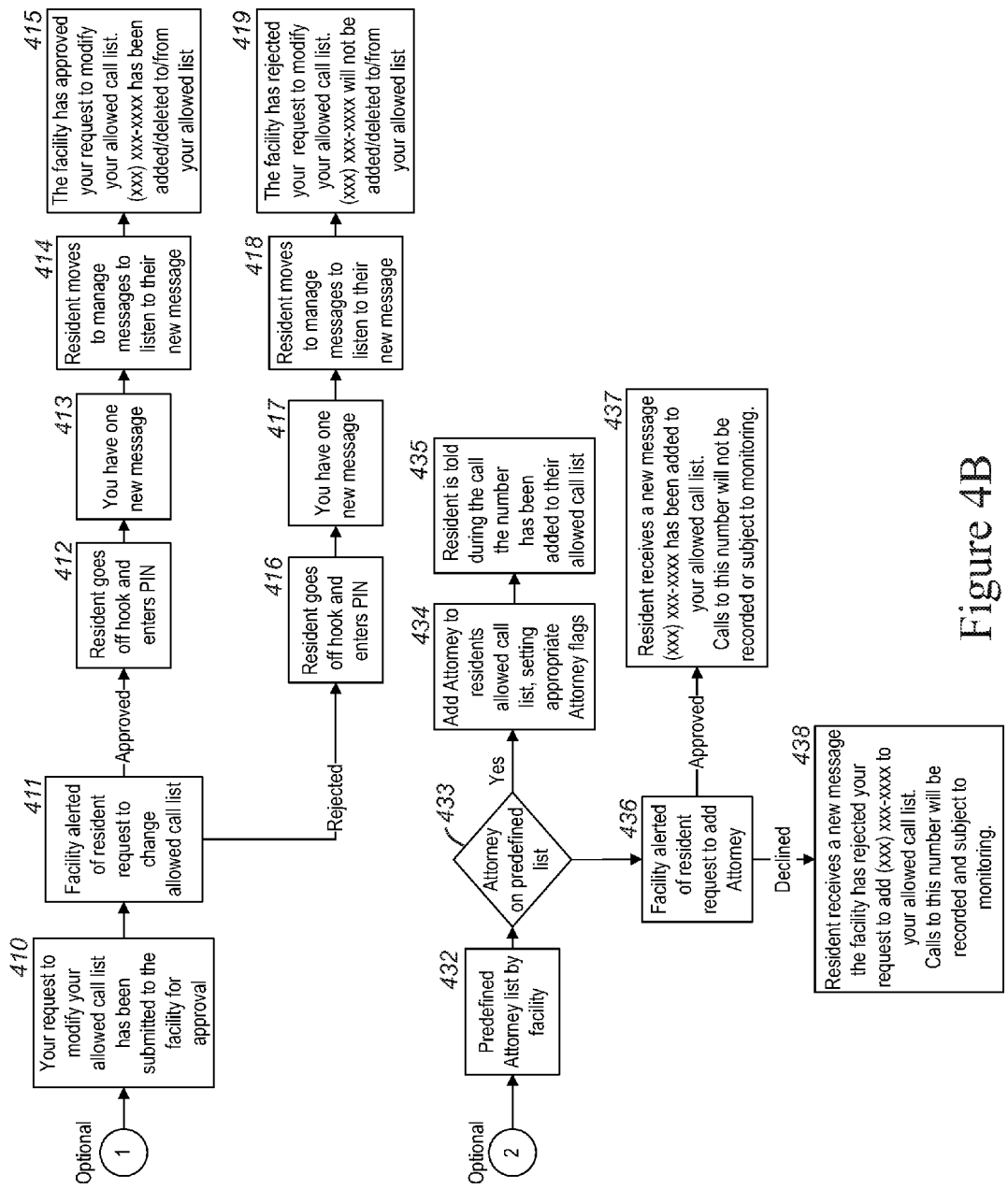
FIG. 4B is a continuation of the flowchart in FIG. 4A.

FIG. 4 illustrates processes performed by a Customer Service Process 400 according to certain embodiments. The process begins at box 401 where the resident causes the telephone to go off hook and is prompted to enter his PIN. The process then proceeds to box 402 where the resident is presented a set of options in a calling tree. In this exemplary embodiment, the resident selects an option of sending a message to the TSP at box 403, and at box 404, the resident selects a more specific option from the calling tree to change the resident's allowed calling list. At decision box 405 the resident indicates whether he wishes to delete a number from the list. If the answer is "yes" the process branches to box 406 where the resident is prompted to enter information about the number to be deleted from the list. At box 407 the resident enters the number to be deleted, and at box 408 the process informs the resident of the number the resident entered. The resident can be given the option to re-enter the number or confirm that it has already been entered correctly. From box 408 the process proceeds to box 409 where the resident is informed that the number has been successfully deleted. In an optional embodiment, designated here as Option 1, the process can proceed from box 408 to 410 where the process informs the resident that his request has been submitted to the facility for processing. At decision box 411 the facility then indicates whether the request is approved or rejected. If the request is approved, the process then branches to 412 where the resident causes the telephone to go off hook and is prompted to enter his PIN. The process then informs the resident at box 413 that a message is available and at box 414 the resident selects appropriate options to listen to the message. At box 415 the process informs the resident that the request was approved and appropriate action was taken. Returning to decision box 411, if the request is rejected then the process branches to boxes 416-419, which are analogous to process boxes 412-415.

Returning to decision box 405, if the answer is "no" the process branches to decision box 420 where the resident indicates whether he wishes to add a number to the list. If the answer is "no" the process ends or it could branch to other options (not shown). If the answer is "yes" the process branches to box 421 where the maximum number of allowed numbers is checked. If the maximum number has already been reached, the process branches to box 422 where the resident is informed that the maximum number has been reached and that a number must be deleted before a new number can be added. The processes then proceeds to decision box 405. If the maximum number of allowed numbers has not been reached, the process branches from box 421 to box 423 where the resident enters information about the number he wishes to add to the list. At boxes 424-428 the resident indicates his relationship to the person whose number is being added to the list. Once this relationship is indicated the process proceeds to box 429 where the process informs the resident of the number the resident entered. The resident can be given the option to re-enter the number or confirm that it has already been entered correctly. The process then proceeds to box 430 where the resident is informed that the number has been successfully added. If the number added to the list pertains to a special class of persons, such as for example those involved with legal representation of the resident, the process can further proceed to box 431 to inform the resident of any conditions that may be applied as a result of the relationship.

In an optional embodiment, the process can proceed from box 429 to the process implementation described as Option 1 above. In a further optional embodiment, designated here as Option 2, the process can proceed from decision box 427, where the resident indicates that his relationship to the person whose number is to be added to the list pertains to legal representation, to box 432 where the process accesses a list of attorneys maintained by the facility. At decision box 433, if the number to be added is associated with an attorney already entered on the list, then the process branches to 434 where the attorney's number is added to the resident's allowed calling list, and the resident is so informed at box 435. Any necessary parameters pertaining to the resident's permitted interactions with the attorney can also be saved. If at decision box 433 the attorney is not already on the list, then the process branches to decision box 436 where the facility indicates whether the request to add the attorney to the resident's allowed calling list is approved or denied. If the request is approved, the process branches to 437 where the attorney's number is added to the resident's allowed calling list, and the resident is so informed. If the request is rejected, the process branches to box 438 where the resident is informed that the request has been rejected.

Option 2 as described above introduces a new method for allowing the facility to pre-approve attorney numbers, eliminating the need for the facility to manually check each such request. With a predefined attorney list, when a resident attempts to add an attorney to their allowed call list the system can automatically allow the number or route the number for facility approval.

To Report a Broken Phone:

This option can be provided to allow the resident to report directly to the TSP when a phone is in need of repair. By selecting this option the resident can be prompted with a series of questions to determine the exact nature of the repair. The following exemplary sub-menu presents possible options that can be presented to the resident:

To report a broken phone, press 3
    If the phone is in the same area as the phone you are using to place this report, press 1
        If the handset is broken, press 1
        If the keypad is broken, press 2
        If the phone does not respond when you lift the handset, press 3
        If the phone has been removed from the wall, press 4
        If you have experienced poor sound quality on multiple calls press 5
        To return to the previous menu, press 9
    If the phone is in another area of the facility, press 2
        Please tell us where the phone is located
        If the handset is broken, press 1
        If the keypad is broken, press 2
        If the phone does not respond when you lift the handset, press 3
        If the phone has been removed from the wall, press 4
        To return to the previous menu, press 9

Under the first option of reporting a broken phone in the same area as the phone the resident is using, the TSP can log the location of the phone with the message and allow TSP operations staff to efficiently investigate the problem phone. With the second option of reporting a phone in another area of the facility, the resident can be allowed a short period of time, e.g. 10 seconds, to verbally tell the TSP operations staff where the phone is located.

The TSP's operations staff can respond directly back to the resident with the results of their investigation of the broken phone report through the use of predefined messages. An example of such reporting is as follows:

Your mm/dd/yyyy report of a broken phone has been received and the repair has been scheduled for mm/dd/yyyy. Thank you Your mm/dd/yyyy report of a broken phone has been received and no problem was found.

In some embodiments, a Customer Service process provides for methods of initiating test calls on the resident's behalf, in the case of a reported inability to connect to a particular telephone number. These test calls can emulate an actual call flow process and immediately report back to the resident as to the nature of the issue. Additionally, in the event that the issue requires intervention by telecommunications personnel, the event record can be maintained in an "open" rather than "resolved" status, for further handling by telecommunications staff. The test call process incorporates various methods for determining the nature of the issue, including, but not limited to, problems with available account funds, invalid telephone numbers, request by the external party for non-contact, and telecommunications equipment malfunction or misconfiguration. Further, methods are provided to enable the test call process to detect external phone numbers that are using so-called "No Caller ID blocking" devices or services. Capabilities are also provided that optionally limit the amount of information provided to the resident, in accordance with privacy concerns. Likewise, the system also provides for a higher level of information to optionally be provided to an authenticated facility staff member using the system.

In some embodiments, a Customer Service process provides for methods and techniques enabling telecommunications support staff to utilize a real-time application at a remote location or call center to instantly become aware of and respond to customer service events created at the institution. The real-time application enables support staff to examine the customer service request and immediately link to all relevant data which has been captured, or is already historically stored. Such data may include, but is not limited to, calling history, previously recorded phone call conversations, call charges and rates, test call results, and payment history.

In some embodiments, a Customer Service process can provide methods for the telecommunications support staff to mark a customer service event as resolved, or to escalate the matter to a further support level or department. Upon resolution of the issue, the applicable support staff can choose from a predetermined list of resolution codes, each code having a predefined response to be given to the resident as notification of the resolution. The text verbiage associated with each response code may be delivered to the resident either by means of a text-to-speech ("TTS") engine, or by use of pre-recorded human voice reciting the text.

In some embodiments, a Customer Service process provides methods for the recording and delivery to the resident of a custom-generated voice recording made by the CSR and intended to be unique to the resolution of a particular event. Further, to decrease the possibility of residents and support staff engaging in recording social messages for each other, the system can provide for the marking or "flagging" of any such customer service events that contain custom-generated responses. The system can provide for automated or at-will reporting of these events to institutional staff or telecommunications management.

In some embodiments, a Customer Service process provides methods and techniques for the delivery of custom-generated responses from the CSR to the resident through the utilization of a text-to-voice engine. In this embodiment, the CSR can generate a custom response by inputting a message in text format, which would then subsequently be played back in an audible form to the resident by the text-to-voice engine. This feature provides, in addition to the marking or "flagging" of such custom messages, the ability to store and perform keyword or other searches and reporting on the content of custom messages. Additionally, the utilization of such a text-to-voice engine for delivery of custom-generated customer service responses also provides technical advantages for enabling delivery of messages to residents with hearing or other disabilities via the use of telecommunications-device-for-the-deaf ("TDD") terminals or other such specialized equipment.

In some embodiments, a Customer Service process provides methods for institutional staff to utilize a real-time application to view and report on events generated from within a particular facility or group of facilities that fall under a common jurisdiction or controlling entity. The real-time application utilized by the institutional staff does not provide the capability to resolve issues. However, it does provide the capability to create new customer service events or to escalate existing events.

In some embodiments, a Customer Service process provides methods for residents to request billing and account balance history of resident-based debit accounts and resident-owned prepaid calling cards. Residents may access this feature using the interactive prompts in the telephone system, and the information is delivered by way of automated speech responses detailing a limited number of recent transactions and balances, or optionally, via an interface to a printer located within the institution and monitored by institutional staff.

In some embodiments, a Customer Service process provides methods and techniques to enable the originator of a customer service event to receive information relating to the resolution of the issue. Optionally, the system may be configured to allow on-demand information, whereby the resident can actively request the information upon using the telephone system, or the system may also be configured to provide automatic notification to the resident, whereby the resident, upon attempting to place a subsequent telephone call, and once authenticated, can be automatically informed of the resolution of the issue. Optionally, the system may also be configured to provide information related to the resolution of past issues, up to an optional maximum age of the event.

In some embodiments, a Customer Service process provides methods and techniques that provide for the optional written delivery of responses, resolution and/or status of these customer service events. This may be optionally accomplished by the use of the administrative interface in an on-demand fashion or alternatively, various parameters may be chosen within the software to designate particular classes of events as always deliverable in written format. In each case, provisions are made within the application for facility staff to document the delivery of the written message.

Implementing such functionality of alternative embodiments may involve modifying one or more of the features of the exemplary embodiments disclosed herein.

Announcement Process

The Announcement process makes use of a database, such as database 130, containing records of announcements or messages and further specifies whether an announcement is intended to be global, i.e. played for all users, or whether the announcement is intended for a specific resident or group of residents. As an example, a global announcement record may be used to notify all residents of an upcoming change in meal schedules, whereas another announcement record might be used to inform all residents of a particular unit or dormitory of a change to recreation hours, whereas yet another announcement record may be used to notify a particular individual resident of an upcoming medical appointment. Further, the announcement record database includes other optional parameters, including, but not limited to, the frequency for playing the announcement, the starting and ending time/date windows for playing the announcement, and whether the announcement is intended to be played only once per resident, always played, or played a specific number of times. Methods are provided that enable the telephone system to search for applicable announcement messages upon each use of the telephone system and automatically play back the messages as appropriate.

In some embodiments, an Announcement process provides for the optional playback of messages using a text-to-speech engine, rather than pre-recorded voice.

In some embodiments, an Announcement process provides methods and techniques for residents to acknowledge receipt of the announcement. Various methods of authenticating a particular resident are used in acknowledgement of announcement messages, and may include, but not be limited to, requiring a key-press of a particular digit or set of digits, requiring the entry of an identifying PIN, detecting a resident-worn identifying RF device, as well as various biometric methods, such as voiceprints, retinal scan, fingerprint scan, etc.

In some embodiments, an Announcement process provides methods and techniques for enabling institutional staff to place the telephone system in an "immediate lockdown" mode. The telephone system's immediate lockdown mode responds by interrupting all ongoing telephone conversations and playing a pre-recorded message to the resident instructing the resident that they have been ordered to return immediately to their appropriate lockdown area. This message will play repeatedly until either the handset is hung up or the telephone system is taken out of immediate lockdown mode. Additionally, a pre-recorded message can be played to the non-resident party of the telephone call, informing the party that the call must be disconnected, as well as, optionally, providing any other pertinent information the facility wishes to disclose.

In some embodiments, an Announcement process provides for automated interfaces with institutional management software systems that may contain additional databases whose contents are useful in automatically creating announcement messages without requiring institutional staff intervention.

Implementing such functionality of alternative embodiments may involve modifying one or more of the features of the exemplary embodiments disclosed herein.

Resident-Staff Communication Process

The Resident-Staff Communication process incorporates interactive voice prompts and menu choices into the telephone system to allow the resident to create a request that is permanently stored in a database to be located either locally at the facility, or at a centralized, off-site location maintained by the telecommunications service provider. Further, the Resident-Staff Communication process provides for the use of various techniques and methods to streamline the process of specifying which type of request is desired by the resident. Due to the broad array of choices that may be available, the Resident-Staff Communication process may optionally incorporate the use of voice recognition and/or grouping of requests types by category to reduce the amount of time required to complete the request, as well as to reduce the possibility of errors being made by the resident.

Upon initiating a request, the resident may then subsequently utilize the telephone system to monitor the status of the pending request, or to optionally review past requests that have been closed. Further, the Resident-Staff Communication process can employ use of a real-time software application by the institutional staff to facilitate the fulfillment, documentation, and response back to the initiating resident. The Resident-Staff Communication process further can incorporate methods and techniques into the real-time software application to designate particular users and groups of users that are designated to receive and respond to varying pre-defined categories of requests. Appropriate institutional staff members receive immediate notification of such requests and may respond by taking action, referring the request to a different department, or by closing the request with a response to the resident. In addition, escalation parameters may be employed by institutional staff to specify a sequence of notifications, referrals or other specified actions which may be triggered by a number of potential criteria that are met by a given open or unresolved request. Resident requests that are handled by the Resident-Staff Communication process may include, but are not limited to, requests for non-commissary personal supplies, requests for medical appointments, requests for counseling, requests for library materials, requests for clothing, requests for information regarding privilege eligibility, court dates, visitation status, funds received, and bond information Additionally, the Resident-Staff Communication process can incorporate a database and reporting feature that provides accountability and optional printed documentation regarding all requests received and resolution of the request.

The messaging system can accommodate both PIN-based and non-PIN-based facilities. If the facility utilizes PINs, once the resident goes off hook he can be prompted to enter his PIN. Once the PIN is verified, if the resident has any unheard messages he could hear, for example, "You have 'X' messages". This option would not exist if the facility does not utilize PINs. The calling tree can then be played allowing the resident to select the option they desire.

When a resident selects a messaging option from the calling tree they will hear, for example, the following announcement followed by the main messaging menu based on the options the facility has subscribed to:

"Use of this messaging system is provided as a convenience and a privilege. Abuse of this service with repeated false reports will result in loss of any or all of the messaging functions."

To send a message to the facility, press 1
To send a request to the TSP about the resident phone service, press 2
To manage messages, press 3
To exit the messaging system, press 9

Once the resident selects a valid option from a main messaging menu the resident can be presented a sub-menu based on the facility-subscribed features. For example, the resident might encounter the following options:

For a medical request, press 1
To file a report or grievance, press 2
To report harassment or other activity, press 3
For all other requests, press 4
To return to the previous menu, press 9

If the facility uses PINs all messaging options can be specific to the Resident whose PIN was entered at the beginning of the call. On the other hand, if the facility does not using PINs, then when sending a message the Resident can be given their Resident Identification Number and/or a special one-time code that references the message. The resident can then be prompted to enter the code when listening to new messages.

FIG. 5 illustrates processes performed by a Resident-Staff Communication Process 500 according to certain embodiments. The exemplary process begins at box 501 where the resident causes the telephone to go off hook and is prompted to enter his PIN. The process then informs the resident at box 502 that messages are available and at box 503 presents the resident with the option to enter the messaging system. At box 504 the resident selects an option within the messaging system. In this exemplary embodiment the resident selects the option to manage the messages, but other options may be available as desired. The process then branches to box 505 where the resident selects a sub-option. In this exemplary embodiment the resident chooses to play unheard messages. At box 506 the process then activates the resident's selected sub-option, in this exemplary embodiment the playing of the unheard messages.

If the facility does not use PINs, the flow can be similar with the following changes. FIG. 6 illustrates processes performed by a Resident-Staff Communication Process 600 according to certain embodiments. The exemplary process begins at box 601 where the resident causes the telephone to go off hook. The process then proceeds to box 602 where the resident is presented a set of options in a calling tree. In this exemplary embodiment at box 603 the resident selects the option to manage messages, but other options may be available as desired. The process then branches to box 604 where the resident selects a sub-option. In this exemplary embodiment the resident chooses to play unheard messages. At box 605 the process prompts the resident to enter a code to identify the message or messages that the resident wishes to hear, and at box 606 the process then activates the resident's selected sub-option, in this exemplary embodiment the playing of the unheard messages.

Messages can be purged from the resident's account after a given period of time; however the messages can always be available for facility personnel to review.

All messages can be logged to the RTS for the facility to review. The facility can have the option of allowing all messages to the TSP CSRs, or the facility may choose to approve all messages. This setting can be at the resident level, effectively allowing the facility to allow all messages with the exception of a few residents if desired.

All messages can be kept within a database, such as database 130, for the length of a contract with a facility. Messages can contain date/time, resident ID, nature of message, and station from where the message originated. If a message requires a recorded message, the message can be stored in .WAV or similar format via a file system structure and kept for the length of contract with the facility.

The facility can have access to review and respond to messages via a web-based administrative software provided by the TSP. The facility can define levels of access for each staff member, i.e. medical staff can see all medical messages but need not have access to grievance or harassment messages.

The resident-to-facility messaging option can be presented to the resident, for example, as an option under a main messaging menu. The following exemplary sub-menu can then be presented to the resident when the resident-to-facility option is selected.

For a medical request, press 1
To report a grievance, press 2
To report harassment or other activity, press 3
For all other requests, press 4
To return to the previous menu, press 9

The facility can select which options to use, and options not in use need not be presented in the sub-menu.

The system can incorporate a routing mechanism allowing automatic routing of messages. If the request is not addressed within a given period of time, the system can also incorporate an escalation engine allowing automatic escalation of messages. The facility can set escalation based on, for example, message creation date/time or last update date/time. As an example, four levels of escalation could be provided for each message type within the system:

For a medical request, press 1
   To request a nurse sick call, press 1
     Message escalation
   To request a doctor appointment, press 2
     Message escalation
   To request a dental appointment, press 3
     Message escalation
   To request a counseling appointment, press 4

For drug or alcohol addiction counseling, press 1
  Message escalation
For all other counseling, press 2
  Message escalation The messaging system can allow for each message type to automatically send emails and alerts to the recipient or appropriate personnel in addition to that person learning of the message by logging in the system. For example, an audible alert can sound repeatedly at a personal computer, an alert can be presented on the screen of a personal computer, and/or a light can flash in a particular area of the facility, for example the sick bay. The facility can also enter an unlimited number of notification email addresses for each message type. Emails can be used for notification only, or the system can also allow for facility personnel to respond to the resident via email.

If the facility utilizes PINs the resident's identity can be automatically captured by the messaging system. In the event the facility does not utilize PINs upon submitting any request to the facility the resident can be prompted for their resident ID which can be submitted with the message.

All messages can be logged to a database and kept for the life of contract with a facility. The logged messages can contain date/time stamps and resident/personnel identification for each event in reference to a message allowing for the facility to maintain an audit log for message responses.

Facility can respond via predefined messages within the system. Additionally staff can create a custom response by typing a text/email that will be converted from text to voice for delivery. Custom responses can be flagged for easy identification within the system.

After staff responds to a resident, the next time the resident goes off hook and enters his PIN he will be notified of unheard messages. If the facility does not utilize PINs the resident can access his messages via the special one-time code as outlined under the general messaging system.

For a Medical Request

This option can streamline a resident's request for medical personnel. Upon selecting this option the resident can automatically be told "This system is not intended for emergency reporting. If this is a medical emergency, hang up and speak with the closest officer for immediate assistance." The facility can have the ability to select which options will be available. The following is an exemplary sub-menu that may be presented to a resident:
  To request a nurse sick call, press 1
  To request a doctor appointment, press 2
  To request a dental appointment, press 3
  To request a counseling appointment, press 4
    For drug or alcohol addiction counseling, press 1
    For all other counseling, press 2
    To return to the previous menu, press 9
  To return to the previous menu, press 9

Upon the resident selecting one of the above options, the request can be logged and sent to the necessary medical personnel for response. Each level can have its own escalation process. For example, if a request is not picked up in XX minutes, then an email can be sent to an appropriate person. If there is no response within XX hours, then a reminder email/alert can be sent, and if there is no response within an additional XX+X hours, then an can be sent email to a higher level personnel. Example responses might be:
  You are scheduled to see the doctor on mm/dd/yyyy at hh:mm am/pm
  You are scheduled to see the dentist on mm/dd/yyyy at hh:mm am/pm
  Your request for counseling has been received and approved. Your counseling session is scheduled for mm/dd/yyyy at hh:mm am/pm The logging feature of this process provides for paperless reporting of medical processing carried out at the facility. Because the requests, handling of the requests, and ultimate resolution may be stored in a paperless format in a database such as database 130, reporting of medical processes to accreditation agencies and other entities is facilitated.

To File a Report or Grievance:

This option can allow residents a method to report staff conduct, safety hazards, maintenance issues, etc. The facility can have the ability to select which options are available to the resident and the necessary email notifications and escalations for each option. An exemplary sub-menu might be:
  To report staff conduct, press 1
  To report a safety hazard, press 2
  To report a maintenance issue, press 3
  To return to the previous menu, press 9

Each option can allow the resident to record a short message, e.g. 30-60 seconds, to be delivered to the facility.

To Report Harassment or Other Activity

This option can allow residents a method to report assault, threat, escape, contraband, etc. The facility can select which options are available to the resident and the necessary email notifications and escalations for each option.

When a resident selects this option they can hear, for example, the following message prior to hearing the following(exemplary) sub-menu: "Due to the nature of this report, the report will not be acknowledged with an automated message."
  To report assault or rape, press 1
    If the assault was against you, press 1
    If the assault was against another resident, press 2
    If the assault was against an officer, press 3
    To return to the previous menu, press 9
  To report a threat or harassment, press 2
    If the threat was against you, press 1
    If the threat was against another resident, press 2
    If the threat was against an officer, press 3
    To return to the previous menu, press 9
  To report a planned escape, press 3
  To report contraband, press 4
    To report weapons, press 1
    To report drugs or alcohol, press 2
    To report cell phones, press 3
    To report other contraband, press 4
    To return to the previous menu, press 9
  To report suicide risk, press 5
    If you are considering suicide, press 1
    If you believe that another resident is considering suicide, press 2
    To return to the previous menu, press 9

Each option can allow the resident to record a short message, e.g. 30-60 seconds, to be delivered to the facility.

The logging feature of this process provides for paperless documentation and, if necessary, reporting of grievance processes carried out at the facility. Because the reported grievances, handling of the grievances, and ultimate resolution may be stored in a paperless format in a database such as database 130, tracking, reporting, and review of grievance processes, both current and historical, is facilitated. This feature provides for ease of tracking and reporting to assist with facility paperless accreditation process.

For all Other Requests:

This option can allow the resident to make miscellaneous requests to the facility. The facility can select which options to use and create the necessary notifications and escalations for each option. An exemplary sub-menu is as follows:

To check your calendar, press 1
    To contact a case worker, press 2
        To schedule a visit with a case worker, press 1
    To request a haircut, press 3
    To request a shower, press 4
    To request a special diet, press 5
    If you would like to request access to the law library, press 6
    If you would like to participate in High School/GED classes, press 7
    If you have a scheduled court appearance or hearing that is not related to your current arrest, press 8
        If the court appearance or hearing is in this county, press 1
            Using the keypad please enter the date of the court appearance
            Using the keypad please enter the time of the court appearance
                AM, press 1
                PM, press 2
        If the court appearance or hearing is in another county, press 2
            Using the keypad please enter the date of the court appearance
            Using the keypad please enter the time of the court appearance
                AM, press 1
                PM, press 2
    To return to the previous menu, press 9

Options 5 and 8 in the above exemplary sub-menu could allow the resident to record a short message, e.g. 30-60 seconds, to be delivered to the facility.

Other options need not require a recorded message.

In some embodiments, a Resident-Staff Communication process provides methods and techniques for incorporating electronic signature capabilities to enable users to securely sign and authorize requests and/or responses that may be handled by the Resident-Staff Communication process. In addition, the Resident-Staff Communication process can also provide for the optional automated printing of selected types of requests onto hardware devices located either centrally or advantageously distributed within the facility or at an alternate location. Under this embodiment, the printed request may be delivered to the resident or other originator for a traditional signature authorizing the request. In addition, in some embodiments, facility personnel can monitor the status of messages to monitor, for example, the number of open messages, the number of messages escalated in given period of time, the number of messages resolved in a given period of time, the types of messages, as well as other information that could be monitored through the system, as would be understood by one of ordinary skill in the art. Similarly, in some embodiments, a particular message and activity associated with the message may be monitored to identify, for example, the date, time, and type of message, any actions taken as a result of the message, as well as other information that could be monitored through the system, as would be understood by one of ordinary skill in the art.

Implementing such functionality of alternative embodiments may involve modifying one or more of the features of the exemplary embodiments disclosed herein.

Asynchronous Messaging Process

Methods and techniques are provided that enable these communications to be provided in both PIN-based and non-PIN-base facilities. Further, the Asynchronous Communication process provides methods and techniques that enable delivery confirmation to be provided in one or more of several available formats to either the sending or the receiving parties, as well as to the facility administration, along with information collected pertaining to the identity and/or physical location of the participating party that is located outside of the facility.

In some embodiments, an Asynchronous Communication process employs novel methods and techniques that enable institutional residents to initiate asynchronous communications with parties who are not residents at the institution and who have never before received such communications from this system. Conversely, methods and techniques are also provided that enable non-residents to initiate asynchronous communications with a particular resident who has never before received messages from the non-resident party using this system. In either scenario, information pertaining to both parties can be collected, including, but not limited to, names and locations of the parties, preferred modes of communication and corresponding electronic addresses, phone numbers or other criteria needed to establish electronic communications, along with information required to establish billing or prepayment accounts. Once initiated, the communication request must be acknowledged and approved by the other party, and status reporting is available to the initiating party or to the facility staff regarding the current status of the request. Further, to reduce the possibility of abuse or harassment, the Asynchronous Communication process can provide for the ability to block future communication requests based on multiple criteria, including, but not limited to, requests to or from a particular resident, requests to or from a particular non-resident, or any combination thereof.

In some embodiments, an Asynchronous Communication process also employs methods and techniques to enable the use of smart-phone or other microcomputer applications as communication endpoints, such as client device 110 in this system. These software applications incorporate secure communications with the residential facility telecommunications system infrastructure to enable the non-resident user to enjoy functions including, but not limited to, asynchronous messaging, IP-enabled synchronous voice conversations, secure account payments to resident trust fund accounts or to telecommunications service accounts, corresponding account balance alerts and reminders, and resident information subscription services. These smart-phone or micro-computer applications are designed to be compatible with a number of various operating systems, including, but not limited to, Apple's iOS, Microsoft Windows and Windows Phone, RIM's Blackberry OS, and Google's Android OS.

Figure 7A:
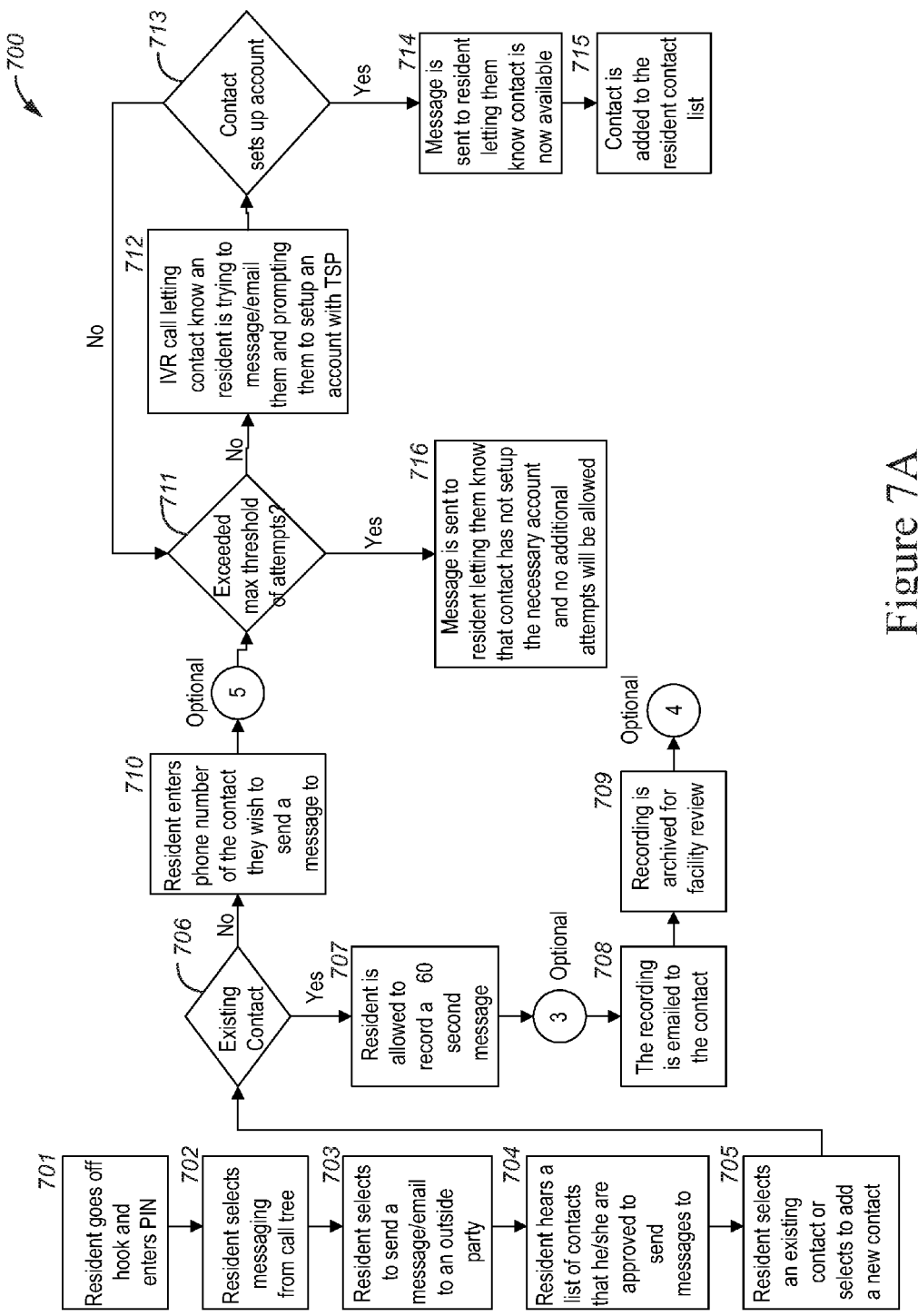
FIG. 7A is a flowchart illustrating functions performed by a Asynchronous Communication Process according to certain embodiments.
Figure 7B:
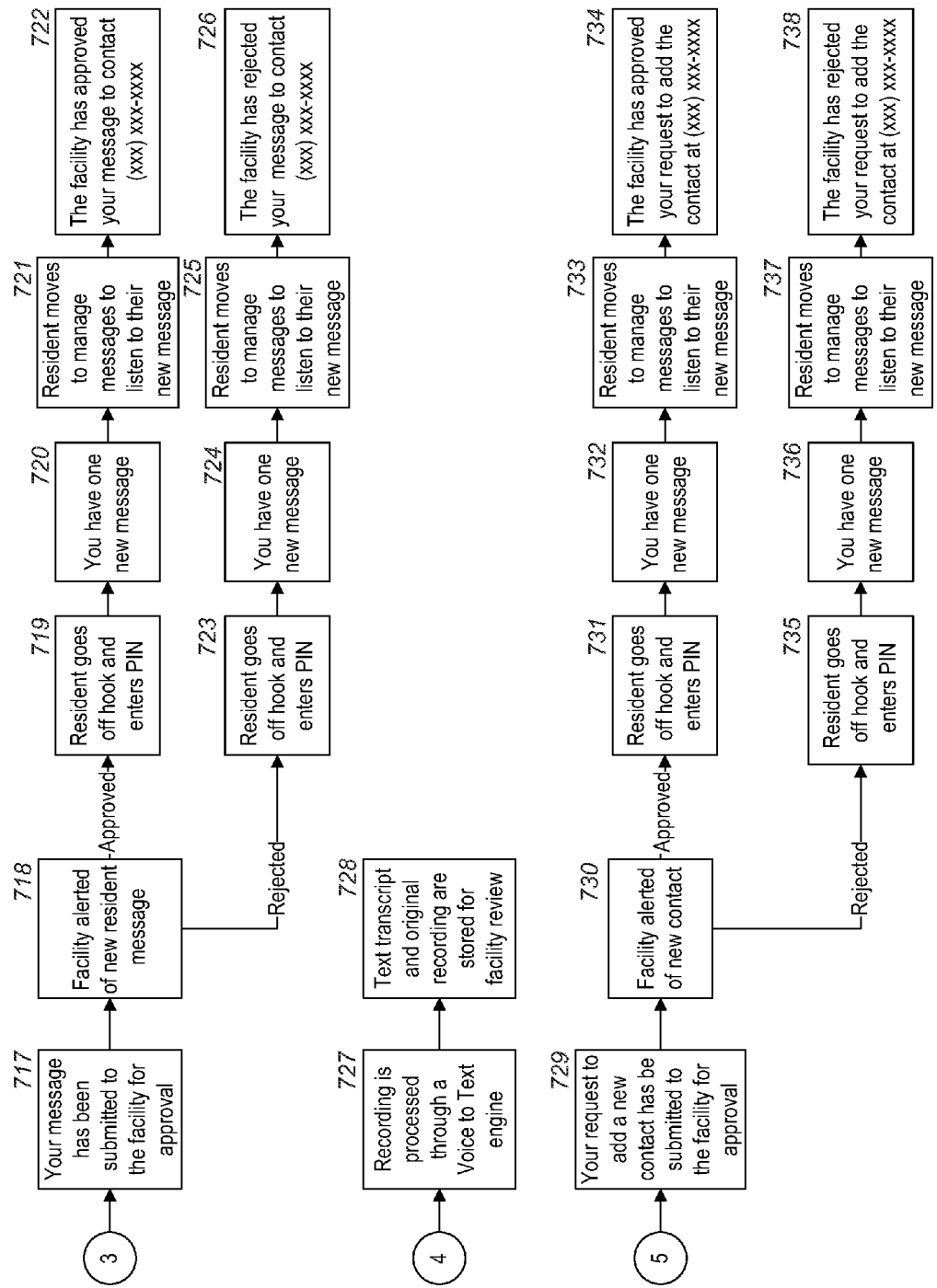
FIG. 7B is a continuation of the flowchart illustrated in FIG. 7A.

FIG. 7 illustrates processes performed by a Asynchronous Communication Process 700 according to certain embodiments. The exemplary process begins at box 701 where the resident causes the telephone to go off hook and is prompted to enter his PIN. At box 702, the resident selects a messaging option from a calling tree. In this exemplary embodiment, the resident chooses at box 702 to send a message or an email to an outside party. The process then provides the resident at box 704 a list of contacts to whom he may send messages. At box 705 the resident selects a contact to whom to send a message or selects an option of add a new contact. At decision box 706, if the resident has chosen to send a message to an existing contact, the process then branches to 707 where the resident records a short message, for example 60 seconds. the process then branches to 708 where the recording is sent to the selected contact, and then to box 709 where the recording is archived for facility review. Returning to decision box 706, if the resident has chosen to add a new contact, then the process branches to box 710 where the resident enters the number of the contact to whom he wishes to send a message. The process then branches to decision box 711 where the process determines whether the maximum number of attempts to send a message to the contact has been exceeded. If not, then at box 712 an IVR system attempts to call the contact to let them know a resident wishes to contact them and asking them to set up an account with the TSP. If at decision box 713 the contact then sets up an account, the process proceeds to box 714 where the process sends a message informing the resident that the contact is now available. The contact is then added to the resident's contact list at box 715. Returning to decision box 713, if the contact does not set up an account, the process branches back to decision box 711. Returning to decision box 711, if the maximum number of attempts has been reached, the process branches to box 716 where a message informing the resident that the maximum number of attempts has been reached and no further attempts will be made.

Within FIG. 7 are several options in some illustrative embodiments. In one illustrative embodiment, the process branches from box 707 optionally to Option 3 (as designated on FIG. 7), which begins at box 717 where the process informs the resident that the message has been submitted to the facility for approval. If at decision box 718 the message is approved the process then branches to boxes 719-722 where the resident enters his PIN and receives a message informing him that the message was approved. If at decision box 718 the message is disapproved, the process then branches to boxes 723-726, which are analogous to boxes 719-722, except the process informs the resident that the message was disapproved.

In another illustrative embodiment designated on FIG. 7 as Option 4, the process optionally branches from 708 to box 727 where a recording is processed through a voice to text engine. At box 728 a text transcript of the recording is then stored for facility review.

In another illustrative embodiment designated on FIG. 7 as Option 5, the process optionally branches from box 710 to box 729 where the resident is informed that his request to add a new contact has been submitted to the facility for approval. If at decision box 730 the contact is approved the process then branches to boxes 731-734 where the resident enters his PIN and receives a message informing him that the contact was approved. If at decision box 730 the contact is disapproved, the process then branches to boxes 735-738, which are analogous to boxes 731-34, except the process informs the resident that the contact was disapproved.

Figure 8:
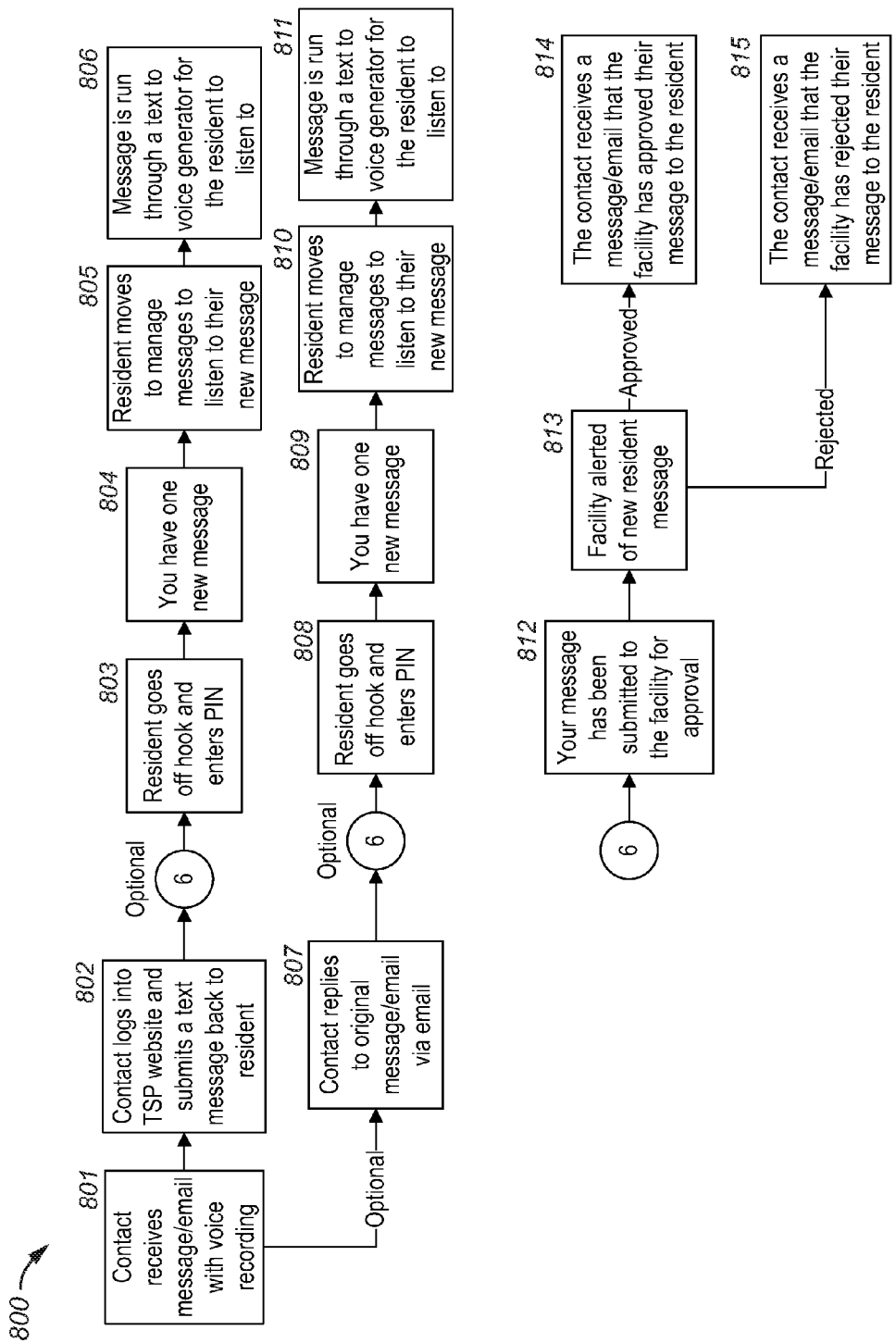
FIG. 8 is a flowchart illustrating functions performed by a Asynchronous Communication Process according to certain embodiments.

FIG. 8 illustrates processes performed by a Asynchronous Communication Process 800 according to certain embodiments. The illustrative embodiment begins box 801 where the contact receives a message or email with a voice recording. The process then branches to box 802 where the contact logs into a TSP website and submits a text message back to the resident, or optionally to box 807 where the contact replies to the original message or email via email. From box 802 the process proceeds to boxes 803-806 where the inmate causes the phone to go off hook, enters his PIN and runs through options to listen to the message, which is converted to voice from text and played to the resident. From box 807 the process proceeds to boxes 808-811, which are analogous to boxes 803-806.

In another illustrative embodiment designated on FIG. 8 as Option 6, the process optionally branches from either of boxes 802 and/or 804 to box 812 where the contact is informed that his message has been submitted to the facility for approval. If at decision box 813 the facility approves the message, then at box 814 the contact is informed that the message has been approved. If at decision box 813 the facility rejects the message, then at box 815 the contact is informed that the message has been rejected.

In another illustrative embodiment the Asynchronous Message process enables a resident to communicate via email, SMS, voicemail, postal mail, or through a custom application that is designed for both mobile devices and PCs to parties outside of the facility. In the following illustrative embodiment the communication is via email, although one of ordinary skill in the art would understand how to adapt these teachings to other communication mechanisms. In this illustrative embodiment, the process begins when the resident goes off hook with the phone and selects a messaging menu. Within the messaging menu an option provides for the resident to send a message to a contact, which may be a party outside of the facility. Once the resident selects the option to send a message he is then asked if he wants to send a message to an existing contact or to add a new contact. If the resident selects to send the message to an existing contact he is read a list of approved contacts, e.g.:

Press 1 for John Smith
Press 2 for Alice Jones
Press 3 for Davey Willis
etc.

The resident selects the contact to whom he wishes to send the message and is then allowed to record a 60 second message to be sent. 60 seconds is used for illustrative proposes and may be any interval, controlled at the facility level and resident level, so that the system can allow individual residents to record shorter or longer messages than the facility default interval. This message is then emailed to the contact in the original .wav format or in a preferred format as specified by the contact. Alternative formats comprise SMS, Postal Mail, and voicemail, into which the message may be translated for delivery.

If the resident selects to add a new contact, the resident is allowed to enter the phone number of the contact to whom they wish to send a message. Once the resident has provided the number he receives a message that the TSP will attempt to contact the party to setup an account so that the contact may receive messages from the resident. An outbound IVR call is then placed to the contact letting the contact know that a resident at the facility wants to send the contact a message, and in order for the contact to receive the message the contact must setup an account with the TSP. The outbound IVR call also instructs the contact how to set up an account, e.g. by accessing a particular web page and following instructions there. The system may attempt to reach the contact "X" times; "X" can be a variable setting at the facility level. If the contact completes the setup process the contact's name is automatically added to the resident's contacts and the resident receives a message informing him the contact is available. When setting up the account, the contact can also indicate a preferred format for messages to be sent to the contact, e.g. voicemail, email, text, etc. If a maximum number of attempts is reached without the contact setting up an account, the resident receives a message informing him the contact has not setup an account and no more attempts will be allowed. If at any point in time the contact wishes to discontinue receiving messages from the resident the contact can inform the TSP, e.g. by accessing a web page, to remove the option for the contact to receive messages. If a contact selects to be removed from an resident's contact list the resident then receives a message telling him of the change.

The contact also has the ability to reply to the resident, for example by logging into a TSP web site and entering a message to be sent. The resident is then notified he has a new message the next time he goes off hook and enters his PIN or onetime identifier. When the resident enters the messaging system and selects playing of new messages, the message is then run through a text-to-voice generator and played to the resident. In other illustrative embodiments the contact can respond to the original email, SMS, or respond with a custom application on the contact's PC or mobile device.

The facility has the option of reviewing/approving all changes to a contact list as well as all messages sent/received through the system. The resident and/or contact can receive status updates throughout the process keeping them informed as to the state of the message.

Implementing such functionality of alternative embodiments may involve modifying one or more of the features of the exemplary embodiments disclosed herein.

Dynamic Help Process

The content provided by the Dynamic Help process can be stored at one or more remote locations such as, for example, a Jail Management System (JMS) or a Commissary, which may be located off site, and can be accessed by the use of, for example, wide area packet-based networks. The content can be regularly updated by the TSP, therefore providing a much better experience to the user, compared to static content that is loaded onto the facility-based equipment and remains unchanged for long periods of time.

In some embodiments, a Dynamic Help process provides methods and techniques for incorporating training and tutorial sequences to be provided to the users of the telecommunications system. These training and tutorial sequences may include, but are not limited to, instruction on proper use of the telecommunications system, answers to frequently asked questions, information regarding residential facility rules such as is commonly found in a resident's handbook, and instructions regarding the various types of payment options available at the particular facility.

Internal Messaging and Documentation Process

Events that are logged may include, but are not limited to, service or maintenance issues within the facility, duly completed inspections or head counts, or potential disciplinary actions. Communications between individual, or groups of, staff members may include, but are not limited to, immediate requests for assistance, injury reports, and risk notifications.

Illustrative embodiments of this process provide for paperless documentation, tracking, reporting, and assessment of various messaging processes carried out as described herein. Because requests, handling of the requests, actions taken, and ultimate resolution may be stored and tracked in a paperless format in a database such as database 130, reporting, analysis (including statistical analysis), historical review, and tracking of messages, requests, complaints, and actions taken in response is facilitated. This feature provides for ease of tracking and reporting to assist with facility paperless accreditation process.

Resident Information Subscription Process

In some embodiments, a Resident Information Subscription process may access database 130 containing information about individual residents. This information may include, but is not limited to, current status, projected release date, upcoming hearings, indigent status, pending criminal charges, and personal funds account balance. As well, certain embodiments provide for interfacing with other external databases or software systems that may be in use at the institution, and that may contain information useful in this feature. The Resident Information Subscription process can further couple to an interface for a non-resident to subscribe to updates to a resident's available information. The interface to the non-resident may take several forms, including, but not limited to, an internet-based application accessed through a client device 110 or an IVR functionality 150 accessed through a non-resident telephone 161. The interface to the non-resident collects data relating to the resident for whom information is desired and the method of delivery to be used to provide the information. Delivery methods may include, but not be limited to, SMS text messaging, Email, secure voice mailbox, or automated telephone delivery. Once subscribed, the non-resident then receives updates at intervals specified by their selection in the interface. Update intervals may include, but not be limited to, once only, at a regular frequency per unit of time, or only when the information changes. The Resident Information Subscription process further provides for methods of cancelling the subscription via the aforementioned interfaces to the non-resident.

Security Features

In some embodiments, security features are implemented using the phone and/or messaging system. For example, a security feature may involve methods and devices that facilitate manual and/or automatic review of communications and messages for specific words or phrases to spot suspicious calls and system abuse. In one specific example, one or more device(s) are configured to execute computer-readable instructions to monitor some or all of the voice communications and messages. The device(s) performs a key word search on the text for any key phrases or specific words. As another example, statistical information related to frequency of communications and messages of particular types, e.g., complaints, requests for medical attention, etc., are tracked on an inmate-by-inmate, cell block, or other bases to help institution personal automatically or manually identify individual instances of abuse, systemic problems, compare institution cell blocks, and otherwise monitor to ensure appropriate use of the messaging and telephone systems.

General

The foregoing detailed description is to be understood as being in every respect illustrative and exemplary, but not restrictive, and the scope of the invention disclosed herein is not to be determined only from the detailed description of illustrative embodiments but according to the full breadth permitted by the patent laws. It is to be understood that the embodiments shown and described herein are only illustrative of the principles of the present invention and that various modifications may be implemented by those skilled in the art without departing from the scope and spirit of the invention.

Embodiments of the present disclosure may comprise systems having different architecture and methods having different information flows than those shown in the Figures. The systems shown are merely illustrative and are not intended to indicate that any system component, feature, or information flow is essential or necessary to any embodiment or limiting the scope of the present disclosure. The foregoing description of the embodiments has been presented only for the purpose of illustration and description and is not intended to be exhaustive or to limit the disclosure to the precise forms disclosed. Numerous modifications and adaptations are apparent to those skilled in the art without departing from the spirit and scope of the disclosure.

Some portions of the detailed description have been presented in terms of algorithms or processes that may take the form of a series of operations on data or signals stored in a computer memory. As a result, these operations take the form of manipulation or transformation of physical quantities. Such quantities may in some instances take the form of electrical or magnetic signals capable of being transformed, stored, retrieved, compared, combined or otherwise manipulated. It is to be understood that all such references to algorithms and processes also refer to the underlying physical quantities and their transformations and manipulations. Similarly, references herein to terms such as "computing," "processing," "determining," and similar terms refer to the actions of a computer or similar platform that transforms or otherwise manipulates data stored as physical quantities within the computer or platform.

Additional embodiments include a computer readable medium or media tangibly embodying program code for implementing one or more aspects of the present subject matter. As an example, embodiments can include media embodying program code executable by one or more processors of a computing system to cause the system to implement methods of treating, disposing, and/or restoring dormant accounts with one or more aspects of the present subject matter as noted herein.

Any suitable computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices, and the like.

We claim:

1. A method, performed by a messaging service computing system, the method comprising:
   receiving access information for a person to access the messaging service computing system;
   based on the access information, providing access to services administered by institution staff and phone services provided by a telecommunications service provider;
   receiving a selection of a messaging service to send a message about an issue;
   sending the message about the issue based on the selection; and
   providing the message about the issue for review by a staff member of the institution staff;
   receiving input from the staff member marking the issue as resolved or escalating the issue to a further support level or department;
   upon resolution of the issue, receiving a selection from the staff member from a predetermined list of resolution codes corresponding to the resolution of the issue, each of the resolution codes having a predefined, non-custom response to be provided to the resident as a notification of the resolution of the issue; and
   logging the message, wherein logging the message comprises storing a date or time stamp, a resident personal identifier, and the resolution of the issue.

2. The method of claim 1, wherein logging the message makes the message available for review by the institution staff or review by the telecommunications service provider or for reporting purposes.

3. The method of claim 1, wherein logging the message provides for paperless reporting of medical processing events carried out at the institution.

4. The method of claim 1, wherein logging the message provides for paperless reporting of grievance processing events carried out at the institution.

5. The method of claim 1, wherein the message relates to a service or maintenance issue within the institution.

6. The method of claim 1, wherein the message relates to a duly completed inspection or head count within the institution.

7. The method of claim 1, wherein the message relates to a disciplinary action within the institution.

8. The method of claim 1 further comprising providing an option for the staff member to create a custom message, wherein selection of the option to create the custom message flags the custom message for review.

9. The method of claim 8, wherein the option for the staff member to create the custom message is an option for the staff member to create and send a custom-generated voice recording.

10. The method of claim 8, wherein the option for the staff member to create the custom message receives input to create a text message and converts the text message to audible form by a voice-to-text engine.

11. The method of claim 10, wherein the option for the staff member to create a custom message flags custom messages based on detecting keywords in the text message.

12. The method of claim 1 further comprising automatically identifying inappropriate system use based on detecting keywords.

13. The method of claim 1 further comprising automatically identifying inappropriate system use based on detecting frequency of communications.

14. The method of claim 1 further comprising automatically identifying inappropriate system use based on detecting messages of particular types.

* * * * *